(12) United States Patent
Harmon

(10) Patent No.: US 11,325,121 B2
(45) Date of Patent: May 10, 2022

(54) ANALYTE DEPLETION FOR SENSOR EQUILIBRATION

(71) Applicant: QORVO US, INC., Greensboro, NC (US)

(72) Inventor: Ian Harmon, Golden Valley, MN (US)

(73) Assignee: QORVO US, INC., Greensboro, NC (US)

( * ) Notice: Subject to any disclaimer, the term of this patent is extended or adjusted under 35 U.S.C. 154(b) by 437 days.

(21) Appl. No.: 16/369,119

(22) Filed: Mar. 29, 2019

(65) Prior Publication Data

US 2020/0306749 A1 Oct. 1, 2020

(51) Int. Cl.
| | |
|---|---|
| *G01N 30/00* | (2006.01) |
| *G01N 35/00* | (2006.01) |
| *G01N 15/06* | (2006.01) |
| *B01L 3/00* | (2006.01) |
| *G01N 29/22* | (2006.01) |
| *G01N 29/24* | (2006.01) |

(52) U.S. Cl.
CPC ..... *B01L 3/50273* (2013.01); *B01L 3/502715* (2013.01); *B01L 3/502776* (2013.01); *G01N 29/222* (2013.01); *G01N 29/2425* (2013.01)

(58) Field of Classification Search
CPC ..... B01L 3/502; B01L 3/50273; G01N 30/00; G01N 35/00; G01N 15/06
See application file for complete search history.

(56) References Cited

U.S. PATENT DOCUMENTS

| | | | |
|---|---|---|---|
| 4,410,632 A * | 10/1983 | Dilley | G01N 27/122 422/89 |
| 4,640,756 A | 2/1987 | Wang et al. | |
| 5,932,953 A | 8/1999 | Drees et al. | |
| 8,409,875 B2 | 4/2013 | Johal et al. | |
| 10,234,425 B2 | 3/2019 | Salvati et al. | |
| 2010/0188110 A1* | 7/2010 | Sun | G01N 33/0031 324/694 |
| 2011/0010107 A1* | 1/2011 | Fedder | G01N 27/127 702/22 |
| 2017/0294892 A1 | 10/2017 | Diep | |

* cited by examiner

*Primary Examiner* — Brian J. Sines
(74) *Attorney, Agent, or Firm* — Haynes and Boone, LLP

(57) ABSTRACT

Methods include treating a portion of a sample composition to be tested for presence of an analyte by depleting or blocking the target analyte. The treated composition may be used to equilibrate an acoustic wave sensor prior to exposing the sensor to the untreated sample composition for analysis. By using the treated sample composition, in which the analyte is depleted or blocked, to equilibrate the sensor, the sensor may be equilibrated with a composition having a similar viscosity and non-specific binding characteristics to the untreated sample composition, which should result in improved accuracy when analyzing the analyte in the untreated sample composition.

6 Claims, 10 Drawing Sheets

ANALYTE DEPLETION FOR SENSOR EQUILIBRATION

TECHNICAL FIELD

The present disclosure relates to sensor devices, such as acoustic wave sensor devices having biomolecules or ligands configured to bind an analyte.

BACKGROUND

Sensor devices having acoustic wave sensors for detecting the presence of an analyte in a sample often have biomolecules, such as antibodies or other proteins such as receptors, polynucleic acids, or the like attached to their surfaces. The analyte may bind to the biomolecule attached to the surface of the sensor and increase the mass bound to the sensor. The increased mass alters the wave propagation characteristics (e.g., magnitude, frequency, phase, etc.) of the sensor. The change in propagation characteristics due to analyte binding may be correlated with the amount of bound analyte and, thus, the amount of analyte in the sample.

One of the challenges of using an acoustic wave sensor for analyte detection is discriminating the changes in propagation characteristics due to viscosity and non-specific binding associated with sample composition to be tested from the changes in propagation characteristics due to mass binding.

SUMMARY

The present disclosure relates to, among other things, acoustic wave sensor devices and to methods that treat a portion of the sample composition to be tested by depleting or blocking the target analyte. The treated composition may be used to equilibrate the sensor prior to exposing the sensor to the untreated sample composition for analysis. By using the treated sample composition, in which the analyte is depleted or blocked, to equilibrate the sensor, the sensor may be equilibrated with a composition having a similar viscosity and non-specific binding characteristics to the untreated sample composition, which should result in improved accuracy when analyzing the analyte in the untreated sample composition.

In some aspects described herein, a method includes providing a composition to be tested for the presence of an analyte; contacting a first portion of the composition with a material configured to block or remove the analyte from the composition; and flowing the first portion of the composition over a surface of a acoustic wave sensor. An analyte capture ligand is bound to the surface of the sensor. The method further comprises flowing a second portion of the composition over the sensor. The second portion of the composition has not been contacted with the material configured to block or remove the analyte.

The method may further comprise driving the acoustic wave sensor into oscillating motion and monitoring an output wave propagation characteristic from the acoustic wave sensor while the first portion of the composition is flowing over the surface of the sensor. The method may further comprise flowing the second portion of the composition over the surface of the sensor after the first portion of the composition has been flowed over the surface of the acoustic wave sensor; monitoring the wave propagation characteristic of the sensor while the second portion of the composition is flowing over the surface of the sensor; and comparing the monitored wave propagation characteristic when the second portion of the composition is flowed over the surface of the sensor to the monitored wave propagation characteristic when the first portion of the composition is flowed over the surface of the sensor. The method may further comprise correlating a change in the monitored wave prorogation characteristic when the second portion of the composition is flowed over the surface of the sensor relative to the monitored wave propagation characteristic when the first portion of the composition is flowed over the surface of the sensor to concentration of analyte in the second portion of the composition.

In some aspects described herein, a device for determining the presence of an analyte in a sample composition includes a sample compartment for containing the sample composition to be tested for the presence of an analyte; an acoustic wave sensor having a surface to which an analyte capture ligand is bound; a first fluid flow path from the sample compartment to the acoustic wave sensor; a second fluid flow path from the sample compartment to the acoustic wave sensor; and a material configured to block or remove the analyte from the sample composition. The material is positioned to contact the sample composition when the sample composition is in the first fluid flow path but does not contact the sample composition when the sample composition is in the second fluid flow path. The material is upstream of the acoustic wave sensor.

In some embodiments, the sample compartment comprises a first sub-chamber and a second sub-chamber. The first fluid flow path comprises the first sub-chamber, and the second fluid flow path comprises the second sub-chamber.

In some embodiments, the sample compartment is configured to cause a first portion of the sample composition to enter the first sub-chamber and a second portion of the sample composition to enter the second sub-chamber when the sample composition is introduced into the sample compartment.

The material configured to remove the analyte from the sample composition may be contained in the first sub-chamber.

In some embodiments, the first fluid flow path comprises a channel, and the material configured to remove the analyte from the sample composition is disposed in or on the channel.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain one or more principles of the disclosure.

Figure 1:
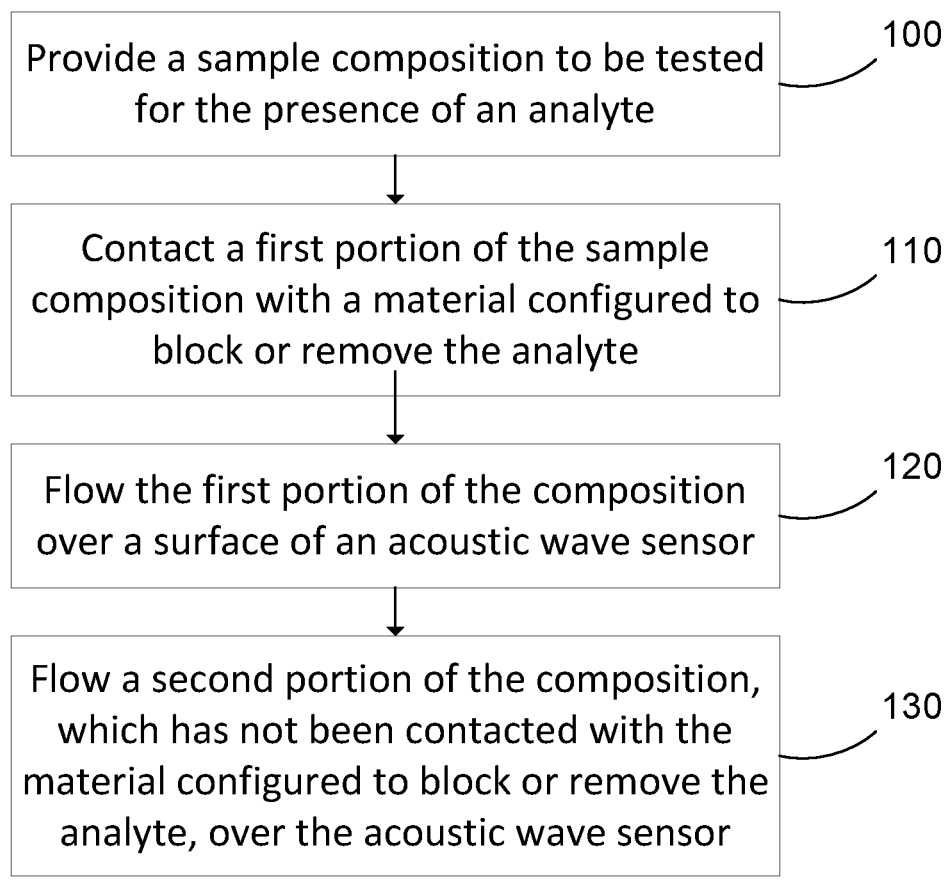
FIG. 1 is flow diagram illustrating an embodiment of a method.

The figures are rendered primarily for clarity and, as a result, the schematic drawings are not necessarily drawn to scale. Moreover, various structure/components may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

Like numbers used in the figures refer to like components, steps and the like.

However, it should be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description several specific embodiments of compounds, compositions, apparatuses, systems and methods are disclosed. It is to be understood that other embodiments are contemplated and may be made without departing from the scope or spirit of the present disclosure. The following detailed description, therefore, is not to be taken in a limiting sense.

The present disclosure relates to sensor devices that include a fluidic acoustic wave sensor having an analyte capture ligand configured to bind an analyte. More particularly, the present disclosure relates to methods for removing analyte from a portion of a sample composition so that the portion with the removed analyte may be used to equilibrate or calibrate the sensor or as a negative control. The present disclosure also relates to devices configured to remove the analyte from a portion of the sample composition prior to the portion being flowed across the surface of the sensor.

The methods and devices described herein include an acoustic wave sensor, such as a bulk acoustic wave (BAW) sensor, which has a surface over which a liquid sample composition may be flowed. An analyte capture ligand is bound to the surface of the sensor. When the sample composition flows across the surface, analyte in the sample, if present, may bind to the surface via the analyte capture ligand and alter the mass at the surface of the sensor. The change in mass may alter one or more wave propagation characteristics of the sensor, which may be used to determine the presence or amount of analyte in the sample.

Viscosity and non-specific binding of the fluid sample composition may result in changes to the wave propagation characteristics of the sensor similar to changes resulting from binding of analyte to the analyte capture ligand that is bound to the surface of the sensor. Accordingly, the sensor would ideally be equilibrated with a composition that has the same viscosity and non-specific binding characteristics as the sample composition. However, because each sample composition may be unique, formulating such a calibration composition de novo may be nearly impossible.

The present disclosure describes, among other things, treating a portion of the sample composition to remove or block analyte, and using the treated portion of the sample composition to equilibrate the sensor prior to contacting the sensor with the untreated sample composition. The treated portion of the sample composition should have a viscosity and non-specific binding characteristics similar to the untreated sample composition, and thus should serve as a suitable composition for calibrating or equilibrating the sensor.

The treated composition may be used to equilibrate a sensor of any device that contains a sensor surface for binding the analyte, such as via an analyte capture ligand.

Referring to FIG. 1, an overview of an embodiment of a method is illustrated.

The method includes providing a sample composition to be tested for the presence of an analyte (100), contacting a first portion of the sample composition with a material configured to block or remove the analyte (110), flowing the first portion of the composition over a surface of the acoustic wave sensor (120), and flowing a second portion of the composition, which has not been contacted with the material configured to block or remove the analyte, over the surface of the sensor (130). An analyte capture ligand is bound to the surface of the sensor.

When the first portion of the sample composition is flowed across the surface of the sensor, binding of the analyte to the surface is reduced and preferably does not occur due to absence of analyte (or blocked analyte) in the first portion of the sample. The first portion of the sample composition may thus serve to equilibrate the sensor prior to flowing the second portion of the sample composition across the surface of the sensor.

Any suitable material may be used to remove or block the analyte from the first portion of the sample composition. The material employed will depend on the analyte to be detected. Non-limiting examples of target analytes include nucleic acids, proteins, peptides, antibodies, enzymes, carbohydrates, chemical compounds, or infectious species such as bacteria, fungi, protozoa, viruses and the like. Any material that binds the target analyte may be used to remove the analyte from the first portion of the sample composition.

The material employed to remove or block the analyte may be specific or non-specific. For example, the material may comprise activated carbon or other suitable filter material to remove small molecules in a non-specific manner, may be antibodies, or may comprise other specific binding moieties. Non-limiting examples of compounds or moieties that the material may comprise to remove the analyte include nucleic acids, nucleotide, nucleoside, nucleic acids analogues such as PNA and LNA molecules, proteins, peptides, antibodies including IgA, IgG, IgM, IgE, binding fragments of antibodies, lectins, enzymes, enzymes cofactors, enzyme substrates, enzymes inhibitors, receptors, ligands, kinases, Protein A, Poly U, Poly A, Poly lysine, triazine dye, boronic acid, thiol, heparin, polysaccharides, coomassie blue, azure A, metal-binding peptides, sugar, carbohydrate, chelating agents, prokaryotic cells and eukaryotic cells.

The compound or moiety configured to interact with the analyte to remove the analyte from the first portion of the sample composition or block the analyte from the sample composition may be immobilized on a solid surface or may be free within a liquid composition (such as the first portion of the sample composition). When the compound or moiety is bound to a solid surface, the compound or moiety is configured to remove the analyte from the first portion of the composition. When the compound is free within a liquid composition, the compound or moiety is configured to block the analyte.

For purposes of the present disclosure, a material that contains a compound or moiety that "blocks" analyte in the first portion of the sample composition is a material that interacts with the analyte such that the analyte in the first portion of the composition does not interact with the analyte capture ligand bound to the surface of the sensor when the first portion of the composition is flowed across the surface of the sensor. Unless the binding affinity of the material to the analyte is substantially greater than the binding affinity of the analyte capture ligand to the analyte, the compound or moiety of the material that binds the analyte is preferably bound to a solid surface to remove the analyte from the first portion of the sample composition.

The compound or moiety of the material that is configured to interact with the analyte may be immobilized on a solid surface in any suitable manner. By way of example, a uniform coating of epoxy silane may be deposited on the solid surface using, for example, a vapor deposition process. If the compound contains a primary amine, such as an antibody, a polypeptide, or other chemical species, the primary amine may react with an epoxide group of the epoxy silane to covalently bind the compound to the solid surface. By way of further example, a thiol group on the solid surface may bind to a thiol moiety on the compound, if present, to form a disulfide bond. The surface of the solid surface may be modified, as appropriate or necessary, to permit binding of the compound.

The solid surface to which the compound may be bound may be a surface of a device configured to determine the presence of the analyte in the sample composition. For example, the compound may be bound to a surface of a well or compartment of the device configured to contain the first portion of the composition, or the compound may be bound to a surface of channel through which the first portion of the composition may be flowed during use of the device. In addition or alternatively, the solid surface to which the compound may be immobilized may be separate from the device, such as a bead or the like, which may then be added to the device (e.g., to a compartment or channel).

The first portion of the sample composition may be contacted with the material by placing the first portion of the sample composition in a compartment, such as a well, containing the material or may be contacted with the material by flowing the first portion of the sample composition over or through the material, for example, when the material is bound to the surface of a channel or placed in a channel through which the first portion of the composition is flowed.

The device preferably includes first and second fluid flow paths. The first fluid flow path is configured to carry the first portion of the sample composition from a sample compartment to one or more acoustic wave sensors that have the analyte capture ligand bound to their surfaces. The second fluid flow path is configured to carry the second portion of the sample composition from a sample compartment to one or more acoustic wave sensors. The second fluid flow path does not include the material configured to remove or block the analyte.

The material configured to remove or block the analyte is positioned to contact the sample composition when the sample composition is in the first fluid flow path but does not contact the sample composition when the sample composition is in the second flow path. The material is positioned such that it contacts the first portion of the sample composition in the first flow path prior to the first portion of the sample composition being flowed across the surface of the acoustic wave sensor. That is, the material is upstream of the acoustic wave sensor.

Preferably, the first portion of the sample composition is contacted with the material to remove the analyte when the sample composition is placed in a device for detecting the analyte or as the first portion of the sample is moved through the device. However, the first portion of the sample composition may be contacted with the material prior to introducing the first portion of the sample composition to the device. For example, a user may contact a first portion of the sample composition with the material prior to inserting the first portion into a first port of the device, and the device may comprise a second port for introducing the second portion of the sample composition that has not been contacted with the composition.

Referring now to FIGS. 2-5, schematic drawings illustrating some components of embodiments of devices 199 for detecting the presence of an analyte in a sample composition are shown. Not all components of the devices 199 are shown for purposes of brevity and illustration.

Figure 2:
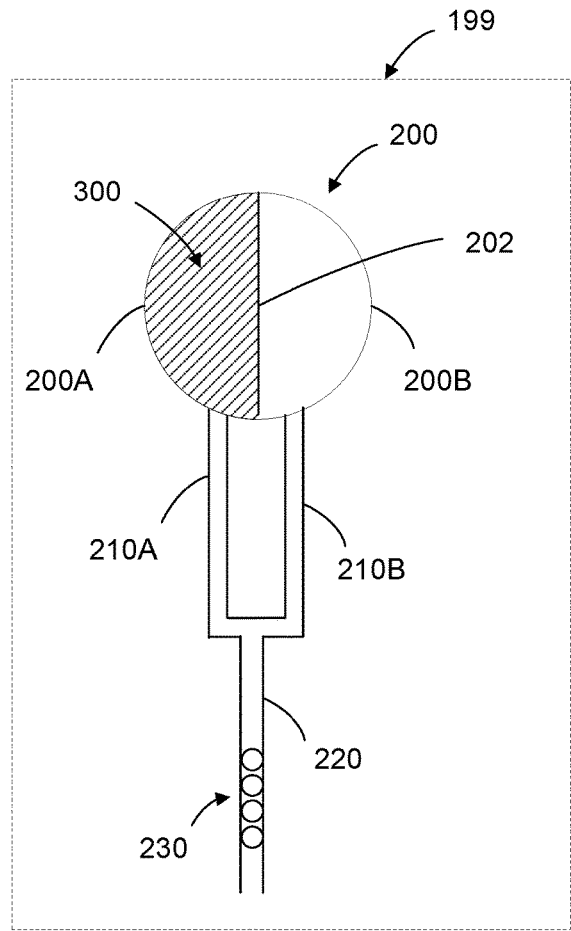
FIGS. 2-5 are schematic cross sectional views of embodiments of a fluidic sensor device showing, among other things, various fluid flow paths.

In the embodiment depicted in FIG. 2, the device 199 includes a sample compartment 200 that comprises a first sub-compartment 200A and a second sub-compartment 200B. The device 199 includes a first fluid flow path that includes the first sub-compartment 200A, a channel 210A in communication with the first sub-compartment 200A, and a channel 220 constructed to carrying fluid over surfaces of one or more acoustic wave devices 230 (four shown). Material 300 configured to remove or block the analyte from the sample composition is disposed in or on the first sub-compartment 200A. The device 199 also includes a second fluid flow path that includes the second sub-compartment 200B, a channel 210B in communication with the second sub-compartment 200B, and the channel 220 constructed to carrying fluid over the surfaces of the one or more acoustic wave devices 230.

In FIG. 2, the sample compartment 200 is constructed such that when a fluid sample composition is introduced into the sample compartment 200, a first portion of the fluid sample composition is introduced into the first sub-compartment 200A and a second portion is introduced into the second sub-compartment 200B. The sample compartment 200 comprises a diverting element 202, such as a wall or ramp, that diverts the first portion of the sample composition to the first sub-compartment 200A and diverts the second portion of the sample composition to the second sub-compartment 200B when the sample composition is introduced into the sample compartment 200, e.g. via a sample port, in a particular orientation. For example, the device 199 may comprise a sample port in communication with the sample compartment 200, and the device 199 may be configured to be particularly oriented when the sample composition is introduced via the sample port. Preferably, the sample compartment 200 is configured such that sample composition may enter the first 200A and second 200B sub-compartments but may not flow back out of the sample compartment 200 in the direction from which it was introduced. For example, the sample compartment 200 may comprise one or more one-way check valves (not shown) to allow flow into, but not back out of, the sub-compartments 200A, 200B.

Figure 3:
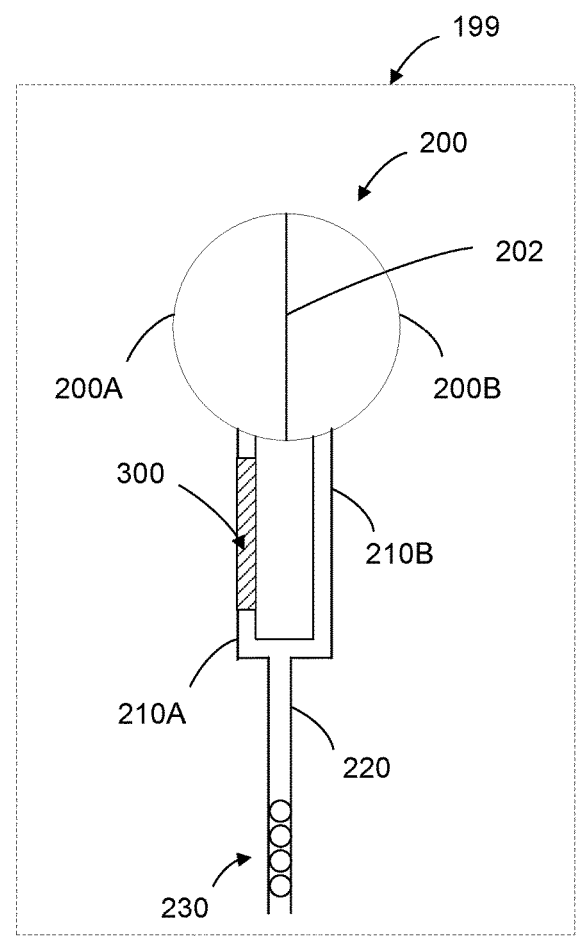

FIG. 3 illustrates an alternative embodiment of some components of a device 199 for detecting the presence of an analyte in a sample composition. Like the device 199 shown in FIG. 2, the device 199 shown in FIG. 3 includes a sample compartment 200 constructed such that when a fluid sample composition is introduced into the sample compartment 200, a first portion of the fluid sample composition is introduced into the first sub-compartment 200A and a second portion is introduced into the second sub-compartment 200B. The sample compartment 200 comprises a diverting element 202, such as a wall or ramp, that diverts the first portion of the sample composition to the first sub-compartment 200A and diverts the second portion of the sample composition to the second sub-compartment 200B when the sample composition is introduced into the sample compartment 200.

The device 199 depicted in FIG. 3 also includes a first fluid flow path that includes the first sub-compartment 200A, a channel 210A in communication with the first sub-compartment 200A, and a channel 220 constructed to carrying fluid over surfaces of one or more acoustic wave devices 230 (four shown). Material 300 configured to remove or block the analyte from the sample composition is disposed in or on channel 210A. The device 199 also includes a second fluid flow path that includes the second sub-compartment 200B, a channel 210B in communication with the second sub-compartment 200B, and the channel 220 constructed to carrying fluid over the surfaces of the one or more acoustic wave devices 230.

Figure 4:
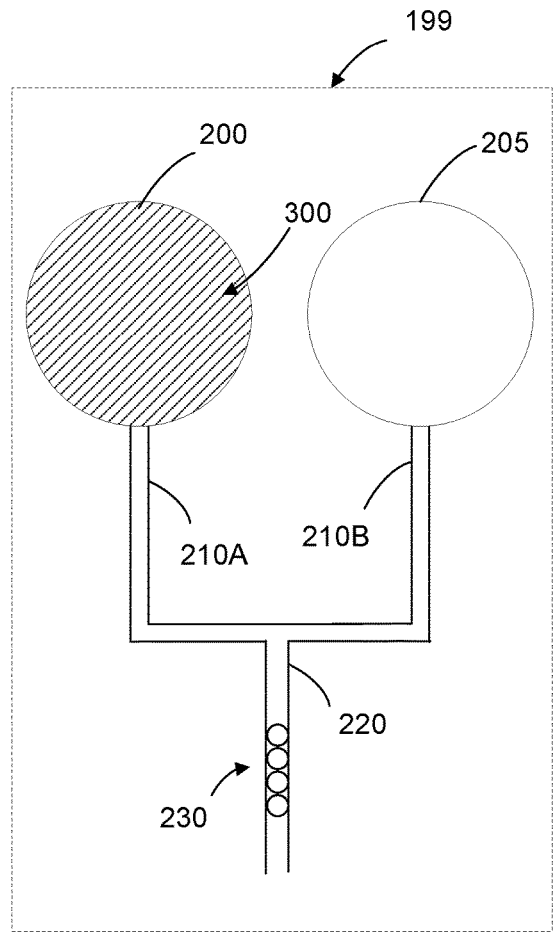

FIG. 4 illustrates an alternative embodiment of some components of a device 199 for detecting the presence of an analyte in a sample composition. The device shown in FIG. 4 includes a first sample compartment 200, in which or on which a material 300 configured to remove analyte from a sample composition is disposed. The device 199 also includes a second sample compartment 205. The first 200 and second 205 sample compartments are configured to contain sample composition. In the depicted embodiment, a user may introduce a fluid sample composition into both the first 200 and second 205 sample compartments.

The device depicted in FIG. 4 also includes a first fluid flow path that includes the first sample compartment 200, a channel 210A in communication with the first sample compartment 200, and a channel 220 constructed to carrying fluid over surfaces of one or more acoustic wave devices 230 (four shown). The device also includes a second fluid flow path that includes the second sample compartment 205, a channel 210B in communication with the second sample compartment 205, and the channel 220 constructed to carrying fluid over the surfaces of the one or more acoustic wave devices 230.

Figure 5:
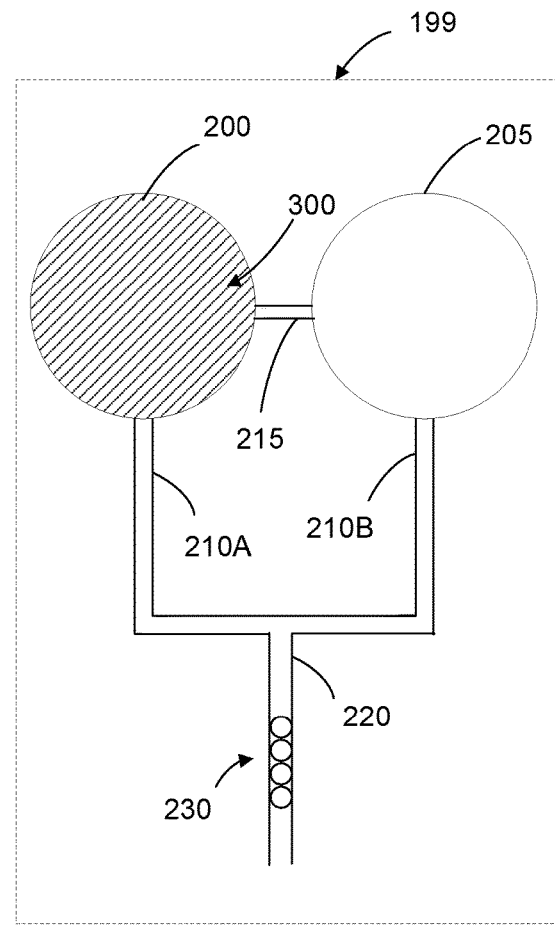

FIG. 5 illustrates an alternative embodiment of some components of a device 199 for detecting the presence of an analyte in a sample composition. The device shown in FIG. 5 includes a first sample compartment 200, in which or on which a material 300 configured to remove analyte from a sample composition is disposed. The device 199 also includes a second sample compartment 205. A channel 215 fluidly couples the first 200 and second 205 sample compartments.

In the embodiment depicted in FIG. 5, a user may introduce a fluid sample composition into second 205 sample compartment and a portion of the sample composition may be flowed through channel 215 from the second sample compartment 205 to the first sample compartment 200. The device 199 may include or may be constructed to be coupled to one or more pumps (not shown), such as pneumatic or vacuum pumps, to cause fluid from the second sample compartment 205 to the first sample compartment 200 via channel 215. The device may include one or more valves (not shown), to allow or prevent flow through the channel 215 as appropriate.

The device depicted in FIG. 5 also includes a first fluid flow path that includes the first sample compartment 200, a channel 210A in communication with the first sample compartment 200, and a channel 220 constructed to carrying fluid over surfaces of one or more acoustic wave devices 230 (four shown). The device also includes a second fluid flow path that includes the second sample compartment 205, a channel 210B in communication with the second sample compartment 205, and the channel 220 constructed to carrying fluid over the surfaces of the one or more acoustic wave devices 230.

In the embodiments depicted in FIG. 2-5, the devices 199 may include or may be constructed to be coupled to one or more pumps (not shown), such as hydraulic or vacuum pumps, to cause fluid from the first sub-compartment 200A or first sample chamber 200 to flow across the one or more acoustic wave devices 230 via the first fluid flow path and to cause fluid from the second sub-compartment 200B or second sample chamber 205 to flow across the one or more acoustic wave devices 230 via the second fluid flow path. The devices 199 may also include or be constructed to be coupled to components for providing an input to and monitoring an output from the one or more acoustic wave devices 230. The device may include or be constructed to be coupled to components for determining the presence or amount of analyte in the sample composition based on one or both of the input to and output from the one or more acoustic wave devices 230.

Figure 6:
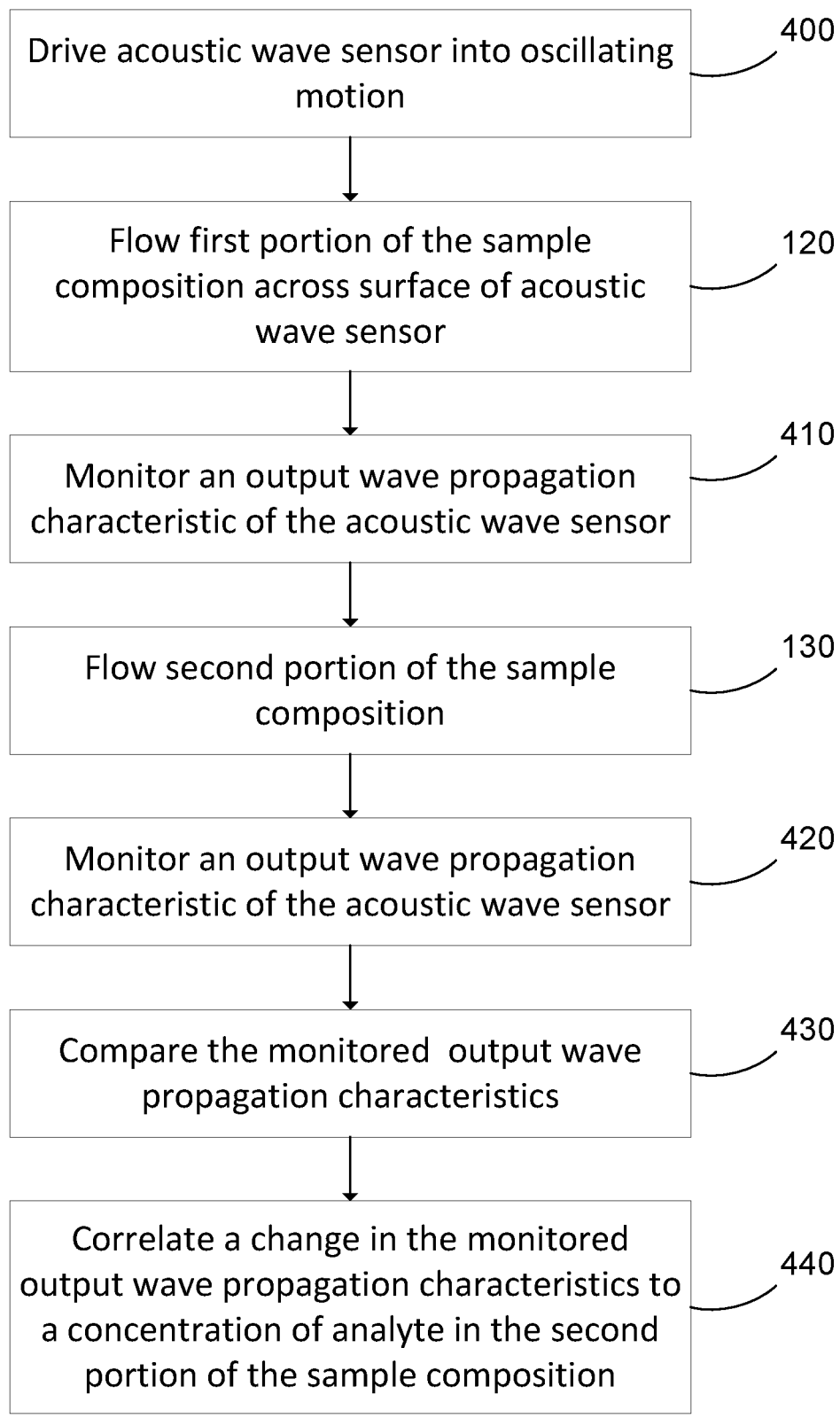
FIG. 6 is flow diagram illustrating an embodiment of a method.

For example, the devices 199 depicted in FIG. 2-5 may be constructed to carry out one or more aspects of the method depicted in FIG. 6, which may be carried out via components of the device, components to which the device is coupled, or a combination thereof.

The method depicted in FIG. 6, includes driving an acoustic wave sensor (such as the one or more sensors 230 depicted in FIGS. 2-5) into oscillating motion (400), flowing the first portion of the sample across the surface of the sensor (120), and monitoring an output wave propagation characteristic from the acoustic wave sensor while the first portion of the composition is flowing over the surface of the acoustic wave sensor (410). Because analyte is removed from the first portion of the sample composition (e.g. by material 300 depicted in FIGS. 2-5), the first portion of the sample composition may be used to equilibrate or calibrate the sensor prior analyte detection.

As depicted in FIG. 6, the method may further include flowing the second portion of the sample composition over the surface of the acoustic wave sensor after the first portion of the composition has been flowed over the surface of the acoustic wave sensor (130), and monitoring an output wave propagation characteristic of the acoustic wave sensor while the second portion of the composition is flowing over the surface of the acoustic wave sensor (420). Analyte, if present in the second portion of the sample composition, may bind with analyte capture ligand on the surface of the acoustic wave sensor causing a change in the monitored output wave propagation characteristic relative to the output wave propagation characteristic when the first portion of the sample composition is flowed across the surface of the sensor.

The method may further comprise comparing the monitored wave propagation characteristic when the second portion of the composition is flowed over the surface of the acoustic wave sensor to the monitored wave propagation characteristic when the first portion of the composition is flowed over the surface of the acoustic wave sensor (430), and may include correlating a change in the monitored wave propagation characteristic when the second portion of the composition is flowed over the surface of the acoustic wave sensor relative to the monitored wave propagation characteristic when the first portion of the composition is flowed over the surface of the acoustic wave sensor to concentration of analyte in the second portion of the composition (440).

Any suitable acoustic wave sensing device may be employed in accordance with the teachings presented herein. An acoustic wave device employs an acoustic wave that propagates through or on the surface of a piezoelectric material, whereby changes to the characteristics of the propagation path affect the velocity and/or amplitude of the wave. Presence of an analyte capture ligand on or over an active region of an acoustic wave device permits an analyte to be bound to the capture ligand, thereby altering the mass being vibrated by the acoustic wave and altering the wave propagation characteristics (e.g., velocity, thereby altering resonance frequency). Changes in velocity may be monitored by measuring the frequency, magnitude, or phase characteristics of the acoustic wave device and may be correlated to a physical quantity being measured.

The acoustic wave devices described herein may include a piezoelectric crystal resonator. With such devices, an acoustic wave may embody either a bulk acoustic wave (BAW) propagating through the interior of a substrate, or a surface acoustic wave (SAW) propagating on the surface of the substrate. SAW devices involve transduction of acoustic waves (commonly including two-dimensional Rayleigh waves) utilizing interdigital transducers along the surface of a piezoelectric material, with the waves being confined to a penetration depth of about one wavelength.

BAW devices typically involve transduction of an acoustic wave using electrodes arranged on opposing top and bottom surfaces of a piezoelectric material. In a BAW device, three wave modes may propagate, namely, one longitudinal mode (embodying longitudinal waves, also called compressional/extensional waves), and two shear modes (embodying shear waves, also called transverse waves), with longitudinal and shear modes respectively identifying vibrations where particle motion is parallel to or perpendicular to the direction of wave propagation. The longitudinal mode is characterized by compression and elongation in the direction of the propagation, whereas the shear modes consist of motion perpendicular to the direction of propagation with no local change of volume. Longitudinal and shear modes propagate at different velocities. In practice, these modes are not necessarily pure modes as the particle vibration, or polarization, is neither purely parallel nor purely perpendicular to the propagation direction. The propagation characteristics of the respective modes depend on the material properties and propagation direction respective to the crystal axis orientations. The ability to create shear displacements is beneficial for operation of acoustic wave devices with fluids (e.g., liquids) because shear waves do not impart significant energy into fluids. BAW devices include bulk acoustic resonators deposited on one or more reflective layers, such as Bragg mirror, and film bulk acoustic resonators having an air-gap.

The acoustic wave devices described herein may employ any suitable piezoelectric thin film. Certain piezoelectric thin films are capable of exciting both longitudinal and shear mode resonance, such as hexagonal crystal structure piezoelectric materials including (but not limited to) aluminum nitride (AlN) and zinc oxide (ZnO). To excite a wave including a shear mode using a piezoelectric material layer arranged between electrodes, a polarization axis in a piezoelectric thin film is generally non-perpendicular to (e.g., tilted relative to) the film plane. In sensing applications involving liquid media, the shear component of the resonator is preferably used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof. Conversely, a piezoelectric material grown with a c-axis orientation that is perpendicular relative to a face of an underlying substrate will exhibit a dominant longitudinal response upon application of an alternating current signal across electrodes thereof.

In some embodiments, the devices described herein are analytical devices that include an analyte capture ligand and a transducer that converts an event of binding of an analyte to the capture ligand into an electrical signal. Certain devices involve a selective interaction between a capture ligand and an analyte. For example, the capture ligand may be a specific binding material (e.g., an antibody, a receptor, etc.) and the analyte may a molecule, a protein, a DNA, a virus, a bacteria, etc. A binding event or a plurality of binding events between the specific binding material and the analyte may be converted into a measurable quantity by a transducer. In other embodiments, sensors may utilize an analyte capture ligand that comprises a non-specific binding material capable of binding multiple types or classes of molecules or other moieties that may be present in a sample, such as may be useful in chemical sensing applications.

Figure 7A:
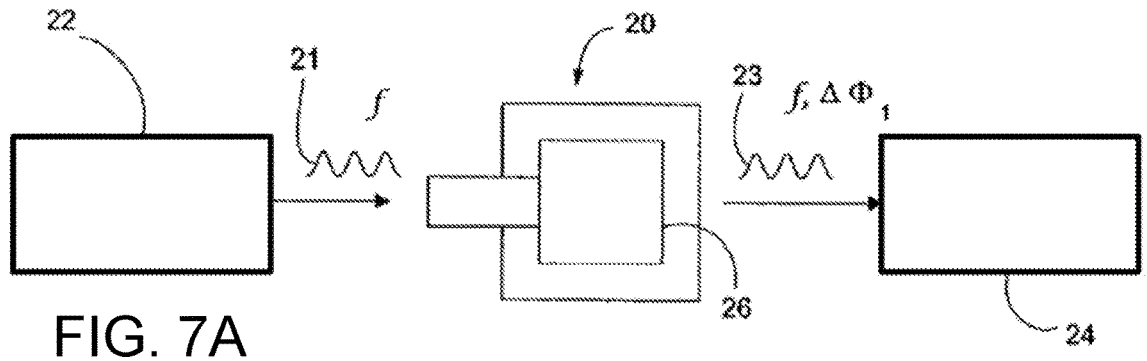
FIGS. 7A-7B, 8, and 9 are schematic block diagrams showing components of embodiments of sensor apparatus or systems.
Figure 7B:
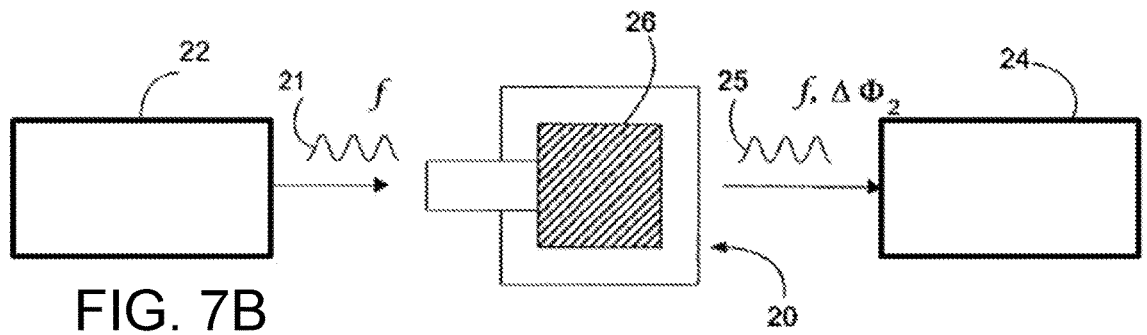

Turning now to FIGS. 7A and 7B, general operating principles of an embodiment of a BAW piezoelectric device 20 used as a sensor to detect an analyte are shown. The BAW sensor 20 typically includes a planar layer of piezoelectric material bounded on opposite sides by two respective metal layers which form the electrodes of the device. The two surfaces of the BAW sensor are free to undergo vibrational movement when the resonator is driven by a signal within the resonance band of the resonator. When the BAW sensor is used as a sensor, at least one of its surfaces is adapted to provide binding sites for the analyte being detected. The binding of the analyte on the surface of the resonator alters the wave propagation characteristics of the BAW sensor, and the changes in the wave propagation characteristics are detected and interpreted to provide quantitative information regarding the analyte being detected.

By way of example, such quantitative information may be obtained by detecting a change in the insertion or reflection coefficient phase shift of the BAW device caused by the binding of the material being detected on the surface of the BAW device. Such sensors differ from those that operate the BAW sensor as an oscillator and monitor changes in the oscillation frequency. Rather such sensors insert the BAW sensor in the path of a signal of a pre-selected frequency and monitor the variation of the insertion or reflection coefficient phase shift caused by the binding of the material being detected on the resonator surface. Of course, sensors that monitor changes in frequency may also be employed in accordance with signal amplification described herein.

In more detail, FIG. 7A shows the BAW sensor 20 before the material being detected is bound to its surface 26. The depicted BAW sensor 20 is electrically coupled to a signal source 22, which provides an input electrical signal 21 having a frequency f within the resonance band of the BAW sensor. The input electrical signal is coupled to the BAW sensor 20 and transmitted through the resonator to provide an output electrical signal 23. In the depicted embodiment, the output electrical signal 23 is at the same frequency as the input signal 21 but differs in phase from the input signal by a phase shift $\Delta\Phi_1$, which depends on the piezoelectric properties and physical dimensions of the BAW sensor. The output signal 23 is coupled to a phase detector 24 which provides a phase signal related to the insertion phase shift.

FIG. 7B shows the BAW sensor 20 with the analyte being detected bound on its surface 26. The same input signal is coupled to the BAW sensor 20. Because the wave propagation characteristics of the BAW device are altered by the binding of the analyte as a perturbation, the insertion phase shift of the output signal 25 is changed to $\Delta\Phi_2$. The change in insertion phase shift caused by the binding of the analyte is detected by the phase detector 24. The measured phase shift change is related to the amount of the analyte bound on the surface of the resonator.

Figure 8:
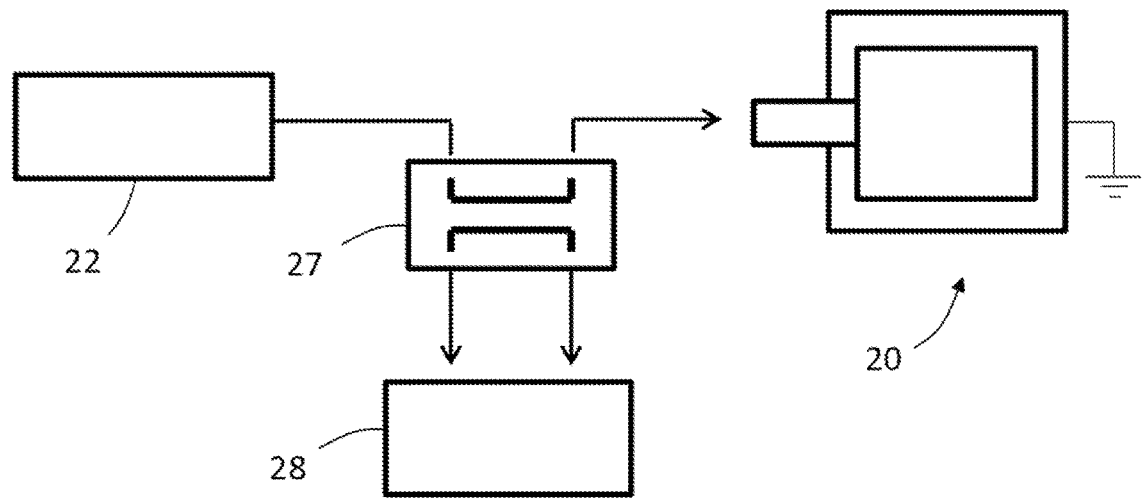

FIG. 8 shows an alternative to measuring the insertion phase of the BAW sensor.

A directional coupler 27 is added between the signal source 22 and the BAW sensor 20 with the opposite electrode grounded. A phase detector 28 is configured to measure the phase shift of the reflection coefficient as a result of analyte binding to the resonator surface.

Other BAW device phase-shift sensors that may be employed with the signal amplification aspects described herein include those described in, for example, U.S. Pat. No. 8,409,875 entitled "RESONATOR OPERTING FREQUENCY OPTIMIZATION FOR PHASE-SHIFT DETECTION SENSORS," which patent is hereby incorporated herein by reference in its entirety to the extent that it does not conflict with the disclosure presented herein. For example, sensor apparatuses may include (i) a sensing resonator comprising binding sites for an analyte; (ii) actuation circuitry configured to drive the BAW sensor in an oscillating motion; (iii) measurement circuitry arranged to be coupled to the BAW sensor and configured to measure one or more BAW sensor output signals representing wave propagation characteristics of the BAW sensor; and (iv) a controller operatively coupled with the actuation and measurement circuitry. The controller can be interfaced with data storage containing instructions that, when executed, cause the controller to adjust the frequency at which the actuation circuitry drives the BAW sensor to maintain a resonance point of the BAW sensor. Accordingly, sensing may be accomplished by actuating the BAW sensor into an oscillating motion; measuring one or more resonator output signals representing wave propagation characteristics of the BAW sensor; and adjusting the actuation frequency of the BAW sensor to maintain a resonance point of the BAW sensor. In embodiments, the frequency at which the actuation circuitry drives the BAW sensor is a frequency of maximum group delay.

Such phase detection approaches can be advantageously used with piezoelectric resonators of different resonant frequencies.

In various embodiments, BAW sensor for use with the methods, devices, and system described herein have resonance frequencies of about 500 MHz or greater, such as about 700 MHz or greater, about 900 MHz or greater, about 1 GHz or greater, 1.5 GHz or greater, about 1.8 GH or greater, about 2 GHz or greater, 2.2 GHz or greater, 2.5 GHz or greater, about 3 GHZ or greater, or about 5 GHZ or greater can provide enhanced sensitivity when used with amplification element mediated mass loaded, which is described in more detail below. In embodiments, the BAW sensors have resonance frequencies of from about 500 MHz to about 5 GHz, about 900 MHz to about 5 GHz, about 1 GHz to about 5 GHz, or about 1.5 GHz to about 5 GHz. For example, the BAW sensors may have resonance frequencies from about 900 MHz to about 3 GHz, about 1 GHz to about 3 GHz, or about 1.5 GHz to about 3 GHz. By way of further example, the BAW sensors may have resonance frequencies from about from 900 MHz to about 2.5 GHz, about 1 GHz to about 2.5 GHz, or about 1.5 GHz to about 2.5 GHz.

Additional details regarding sensor devices and systems that may employ BAW sensors are described in, for example, U.S. Pat. No. 5,932,953 issued Aug. 3, 1999 to Drees et al., and U.S. Pat. No. 10,234,425 issued Mar. 19, 2019 to Salvati and Harmon, which patents are hereby incorporated herein by reference in their entireties to the extent that they do not conflict with the disclosure presented herein.

Any suitable analyte capture ligand may be bound to the surface of the acoustic wave sensor. The analyte capture ligand employed will depend on the analyte to be detected. Non-limiting examples of target analytes include nucleic acids, proteins, peptides, antibodies, enzymes, carbohydrates, chemical compounds, or infectious species such as bacteria, fungi, protozoa, viruses and the like. In certain applications, the target analyte is capable of binding more than one analyte capture ligand. Preferably, the analyte capture ligand selectively binds to target analyte. Non-limiting examples of analyte capture ligands include nucleic acids, nucleotide, nucleoside, nucleic acids analogues such as PNA and LNA molecules, proteins, peptides, antibodies including IgA, IgG, IgM, IgE, antibody fragments, lectins, enzymes, enzymes cofactors, enzyme substrates, enzymes inhibitors, receptors, ligands, kinases, Protein A, Poly U, Poly A, Poly lysine, triazine dye, boronic acid, thiol, heparin, polysaccharides, coomassie blue, azure A, metal-binding peptides, sugar, carbohydrate, chelating agents, prokaryotic cells and eukaryotic cells.

An analyte capture ligand may be bound to the surface of the sensor by covalent binding or non-covalent binding, such as one or more of hydrogen binding, ionic binding, electrostatic forces, Pi-effects, hydrophobic effects, van der Waals forces, and the like. Preferably, the analyte capture ligand is sufficiently bound to the surface of the sensor to remain bound to the surface of the sensor during use of the device employing the sensor. For example, binding of the analyte capture ligand preferably can withstand the flow of fluid sample or wash compositions or buffers employed across the surface of the sensor.

Any suitable method for binding an analyte capture ligand to a surface of an acoustic wave sensor may be used. By way of example, a uniform coating of epoxy silane may be deposited on the sensor surface using a vapor deposition process. Test and reference molecular recognition components, such as antibodies, may then be deposited onto the test and reference resonators using, for example, piezo based nanodispensing technology. Primary amines on the antibodies react with the epoxide groups covalently binding the antibody to the sensor surface. By way of further example, a thiol group, if present, of the analyte capture ligand may bind to a thiol moiety on the surface of the sensor. The surface of the sensor may be modified, as appropriate or necessary, to permit binding of the analyte capture ligand.

In some embodiments, the material configured to remove or block the analyte comprises the same or similar compound or moiety as the analyte capture ligand that is bound to the surface of the sensor. For example, if the analyte capture ligand that is bound to the surface of the sensor comprises an antibody, the material configured to remove or block the analyte may be the same or similar antibody, such as an antigen binding fragment of the antibody.

The description provided above is fairly generic regarding an acoustic wave device structure. Some of the description provided below details embodiments of bulk acoustic resonators that may be employed as an acoustic wave device structure. Preferably, the structure comprises a BAW resonator structure arranged over at least a portion of a substrate, and an analyte capture ligand arranged over at least a portion of an active region of the BAW resonator structure. Various layers may be arranged between the analyte capture ligand and a top side electrode (which is coincident with an active region of a BAW resonator structure), such as: a hermeticity layer (e.g., to protect the top side electrode from corrosion in a liquid environment), an interface layer, and/or a self-assembled monolayer (SAM), with the interface layer and/or the SAM being useful to facilitate attachment of at least one overlying material layer, ultimately including functionalization material. In certain embodiments, the interface layer facilitates attachment of an overlying SAM, and the SAM facilitates attachment of an overlying functionalization material. Additional details regarding embodiments for constructing a BAW resonator are described in, for example, U.S. Patent Application Publication No. 2017/0294892, entitled FLUIDIC DEVICE HAVING UV-BLOCKING COVER, published on Oct. 12, 2017, which application is hereby incorporated herein by reference in its entirety to the extent that is does not conflict with the disclosure presented herein.

The sensors, systems and methods described herein may, optionally, employ an amplification component that may bind to the analyte that is bound to the surface of the sensor via the analyte capture ligand. The amplification component may comprise an amplification element such as a linked enzyme. When the amplification component binds the analyte, the amplification element is immobilized relative to the surface of the sensor. If the amplification element is, for example, an enzyme, a soluble substrate may be converted by the amplification element to an insoluble product, which precipitates and accumulates on the surface of the sensor, thereby amplifying the mass signal as a function of amount or concentration of bound analyte. Examples of signal amplification are described in, for example, U.S. Pat. No. 10,234,425 issued Mar. 19, 2019 to Salvati and Harmon, which patent is hereby incorporated herein by reference in its entirety to the extent that it does not conflict with the disclosure presented herein.

Figure 9:
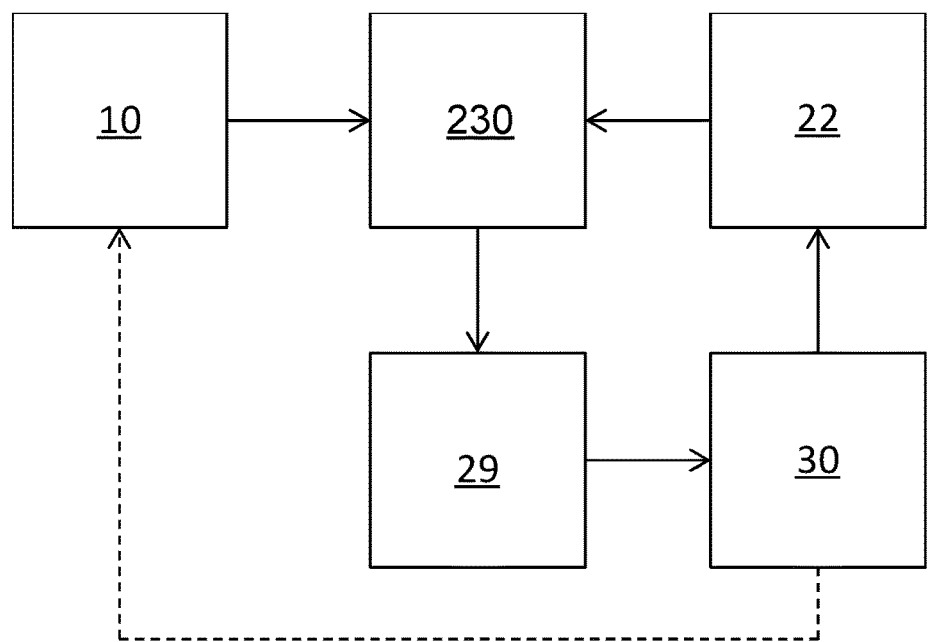

Any suitable device or system may employ an acoustic wave sensor as described herein. By way of example and with reference to FIG. 9, a system for detecting an analyte may include a container 10 (or more than one container or chamber), the acoustic wave sensor 230 (such as the one or more acoustic wave sensors described regarding FIGS. 2-5), actuation circuitry 22, measurement circuitry 29, and control electronics 30. A fluid path couples the one or more containers 10 to the acoustic wave sensor 230 (such as the fluid paths described regarding FIGS. 2-5). The control electronics 30 are operably coupled to the actuation circuitry and the measurement circuitry. In embodiments, control electronics 30 are configured to modify the frequency at which the actuation circuitry 22 oscillates the BAW sensor 20 based on input from the measurement circuitry 29.

Any suitable control electronics 30 may be employed. For example, control electronics may include a processor, controller, memory, or the like. Memory may include computer-readable instructions that, when executed by processor or controller cause the device and control electronics to perform various functions attributed to device and control electronics described herein. Memory may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Control electronics 30 may include any one or more of a microprocessor, a controller, a digital signal processor (DSP), an application specific integrated circuit (ASIC), a field-programmable gate array (FPGA), or equivalent discrete or integrated logic circuitry. In some examples, control electronics 30 may include multiple components, such as any combination of one or more microprocessors, one or more controllers, one or more DSPs, one or more ASICs, or one or more FPGAs, as well as other discrete or integrated logic circuitry. The functions attributed to control electronics herein may be embodied as software, firmware, hardware or any combination thereof.

Figure 10:
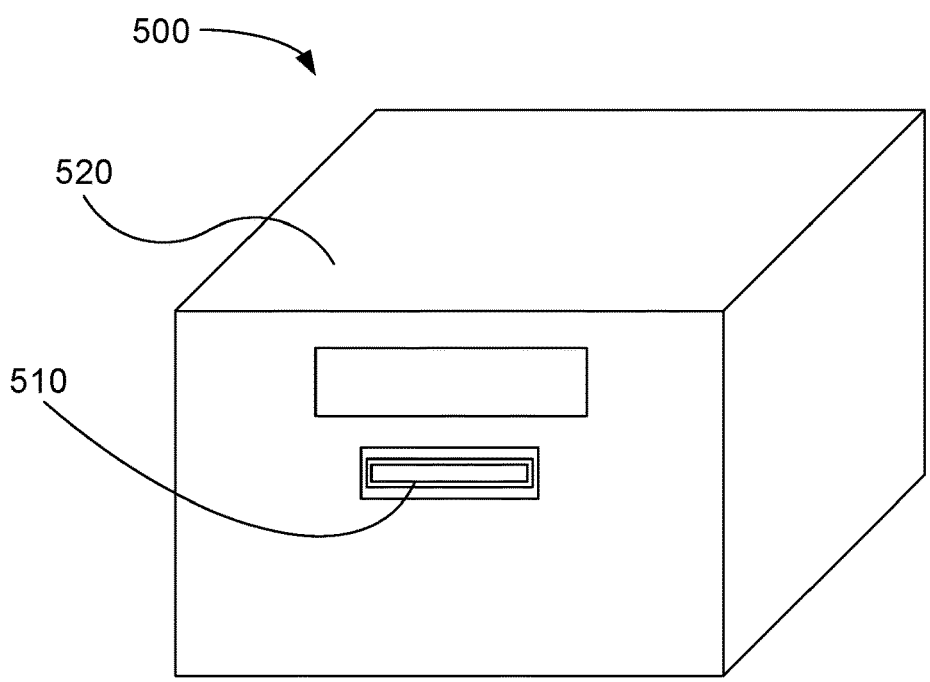
FIG. 10 is a schematic perspective view of an embodiment of a system showing a reader and a cartridge.

As shown schematically in FIG. 10, some components of a sensor system 500 may include a cartridge 510 and a reader 520 constructed to receive the cartridge 510. The reader 520 may provide components used in sample handling and movement in the cartridge 510 and may be used to read and optionally interpret the results from the BAW sensor in the cartridge 510. The cartridge 510 preferably includes integrated components necessary to convert a BAW sensor, or array of BAW sensors, into a biosensor. This allows for a collection of the tools integrated into a single cartridge that can be tailored for the detection of one or more analytes, such as proteins, DNA, bacteria, fungi, viruses, and other biological or non-biological materials. The reader 520 is preferably constructed for use with a variety of different cartridges.

Figure 11:
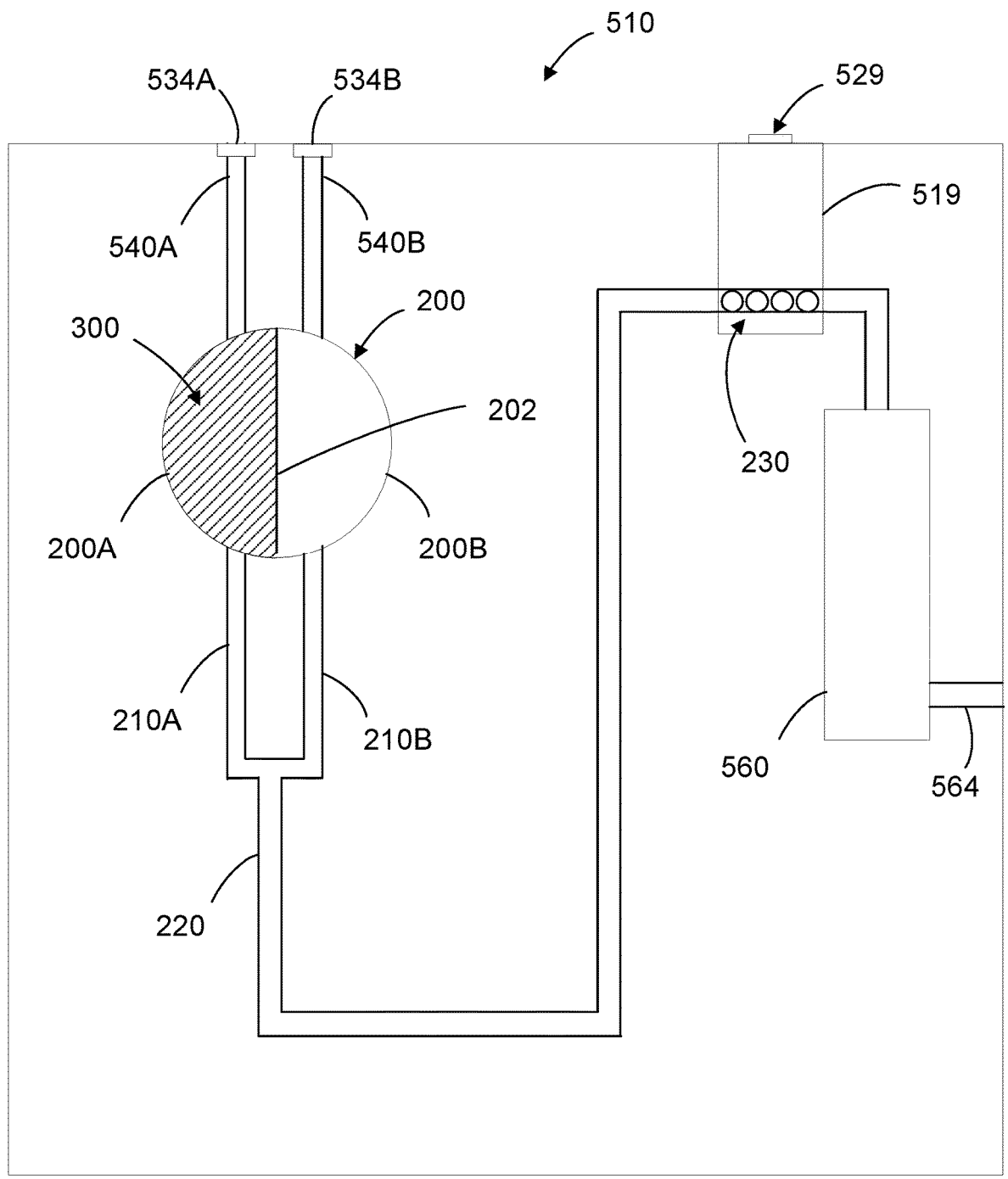
FIG. 11 is a schematic cross sectional view of an embodiment of a cartridge including fluidic sensor apparatus.

An embodiment of a cartridge 510 for use with a reader is depicted in FIG. 11.

The cartridge 510 includes a sample compartment 200 and first and second flow paths similar to that depicted in the device 199 of FIG. 2. However, it should be understood that the cartridge may include components and flow paths as depicted in FIGS. 3-5 or any other suitable flow paths or components to carry out the methods and teachings described herein.

The cartridge depicted in FIG. 11 includes a sample compartment 200 that comprises a first sub-compartment 200A and a second sub-compartment 200B. The sample compartment 200 comprises a diverting element 202, such as a wall or ramp, that diverts a first portion of the sample composition to the first sub-compartment 200A and diverts a second portion of the sample composition to the second sub-compartment 200B when the sample composition is introduced into the sample compartment 200. Preferably, the sample compartment 200 is configured such that sample composition may enter the first 200A and second 200B sub-compartments but may not flow back out of the sample compartment 200 in the direction from which it was introduced. For example, the sample compartment 200 may comprise one-way check valves (not shown) to allow flow into, but not back out of, the sub-compartments 200A, 200B.

Material 300 configured to remove or block the analyte from the sample composition is disposed in or on the first sub-compartment 200A.

As with the device depicted in FIG. 2, the cartridge 510 depicted in FIG. 11 includes a first fluid flow path that comprises the first sub-compartment 200A, a channel 210A in communication with the first sub-compartment 200A, and a channel 220 constructed to carrying fluid over surfaces of one or more acoustic wave sensors 230 (four shown). The cartridge 510 also includes a second fluid flow path that includes the second sub-compartment 200B, a channel 210B in communication with the second sub-compartment 200B, and the channel 220 constructed to carrying fluid over the surfaces of the one or more acoustic wave devices 230.

The depicted cartridge 510 comprises a waste container 560 in communication with channel 220 into which the first and second portions of the sample compositions may flow after flowing across the surfaces of one or more acoustic wave sensors 230. The waste container 560 may also collect other waste material that may be employed in the operation of the cartridge 510 such as buffers or other waste fluids. The waste container 560 may include a waste vent 564 that allows air or gases, but not fluids, to escape the waste container 560 to, for example, equalize pressure within the waste container 560. The waste vent 564 may include a hydrophobic membrane to prevent fluid from passing through the waste vent 564.

The cartridge 510 includes a first connection port 534A and a second connection port 534B for connection with one or more pumps when coupled with a reader (such as reader 520 in FIG. 10) or another suitable device. The first connection port 534A is in fluid communication with the first sub-chamber 200A of the sample chamber 200 via channel 540A. The second connection port 534B is in fluid communication with the second sub-chamber 200B of the sample chamber 200 via channel 540B.

The device also includes sensor apparatus 519 which includes the one or more acoustic wave devices 230 having surfaces in communication with channel 220. In addition to the one or more acoustic wave devices 230, the sensor apparatus 519 may include any suitable components, such as one or more components depicted in and described regarding FIG. 7A, FIG. 7B, FIG. 8, and FIG. 9. The sensor apparatus 230 includes an electrical interconnect 529 for connecting to electrical components of a reader (such as reader 520 in FIG. 10) or another suitable device.

Figure 12:
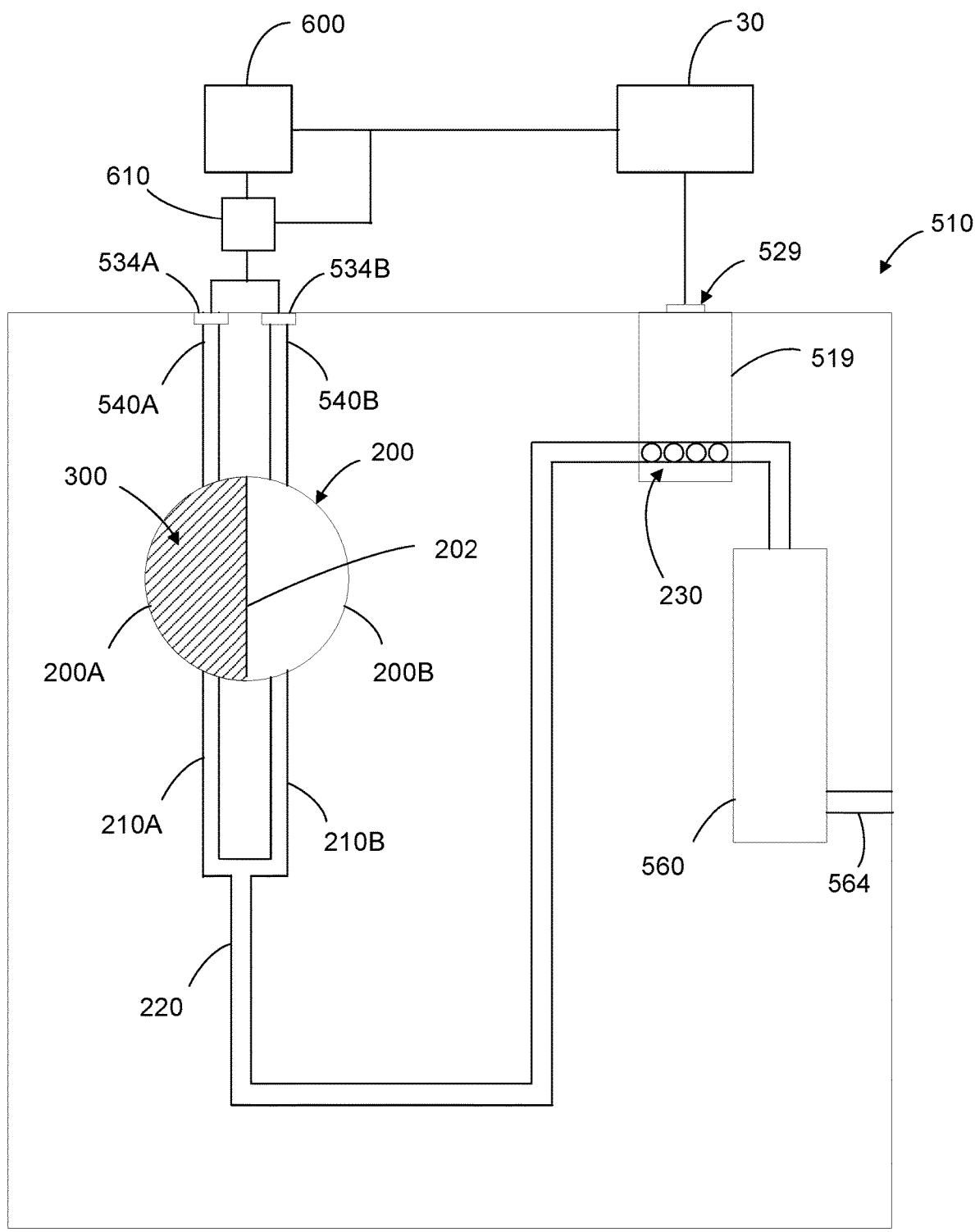
FIG. 12 is a schematic diagram showing the cartridge of FIG. 11 operably coupled to an embodiment of external system components.
Figure 13A:
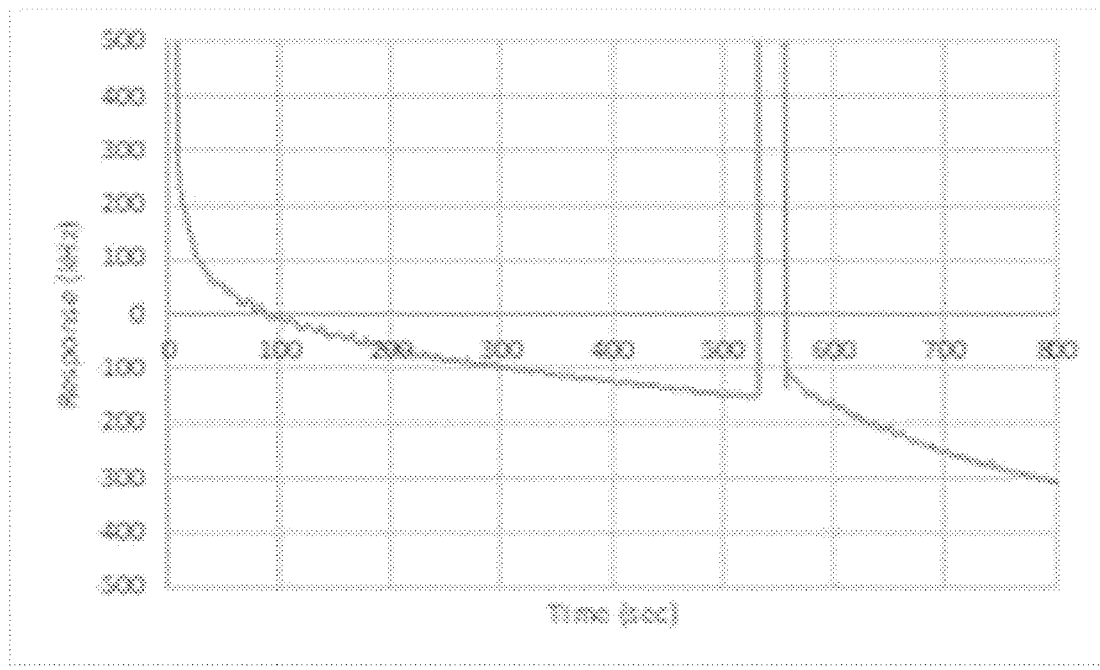
FIGS. 13A-D are graph showing output (response) of a sensor having a surface to which an antibody is bound when serum containing 100 ng/ml of antigen is flowed across the surface 550 seconds after exposure to depleted serum (A); when serum containing 100 ng/ml of antigen is flowed across the surface 550 seconds after exposure to standard wash buffer (B); when serum without antigen (negative sample) is flowed across the surface 550 seconds after exposure to depleted serum (C); and when negative sample is flowed across the surface 550 seconds after exposure to a standard wash buffer. Large blips at ~530 seconds represent air gaps between samples.
Figure 13B:
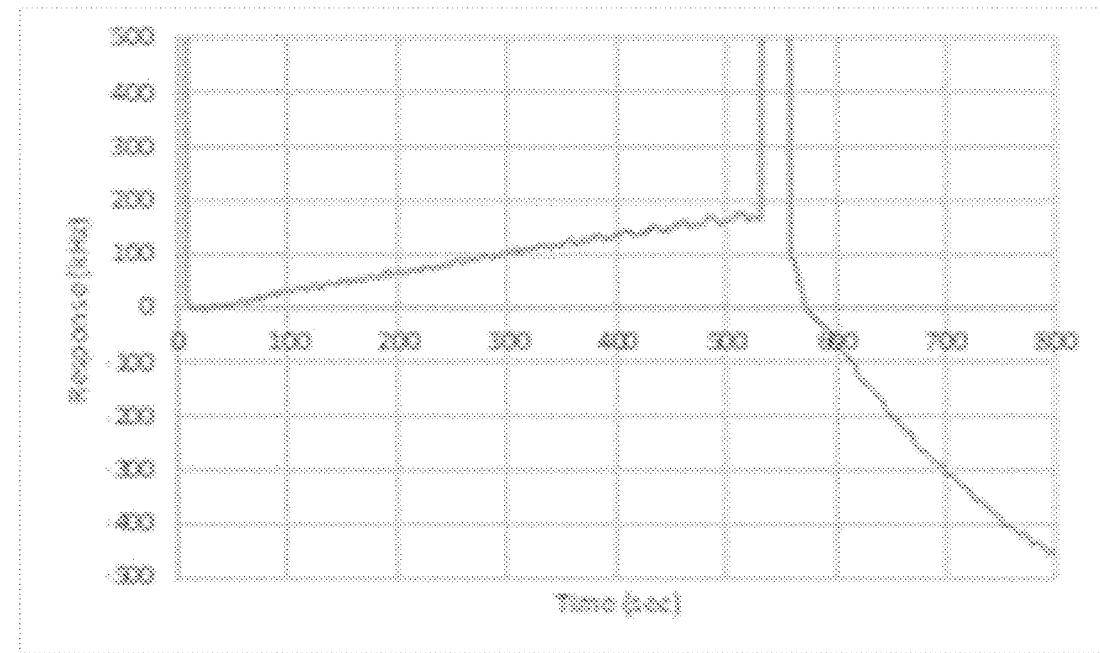
Figure 13C:
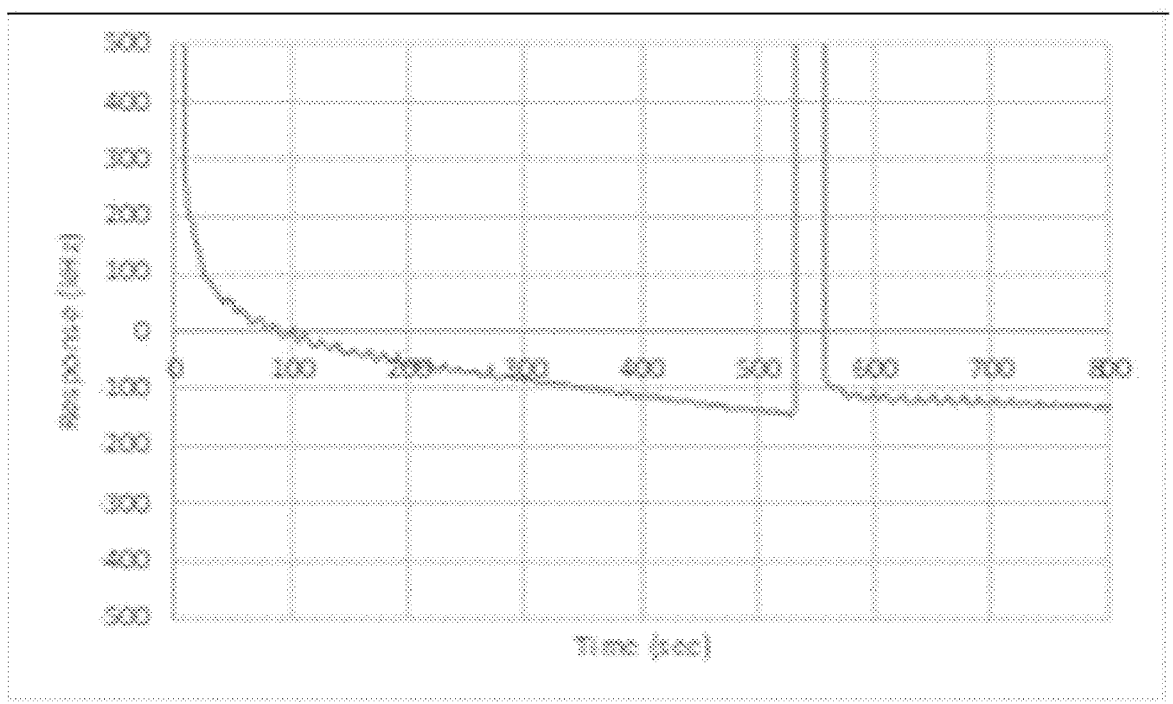
Figure 13D:
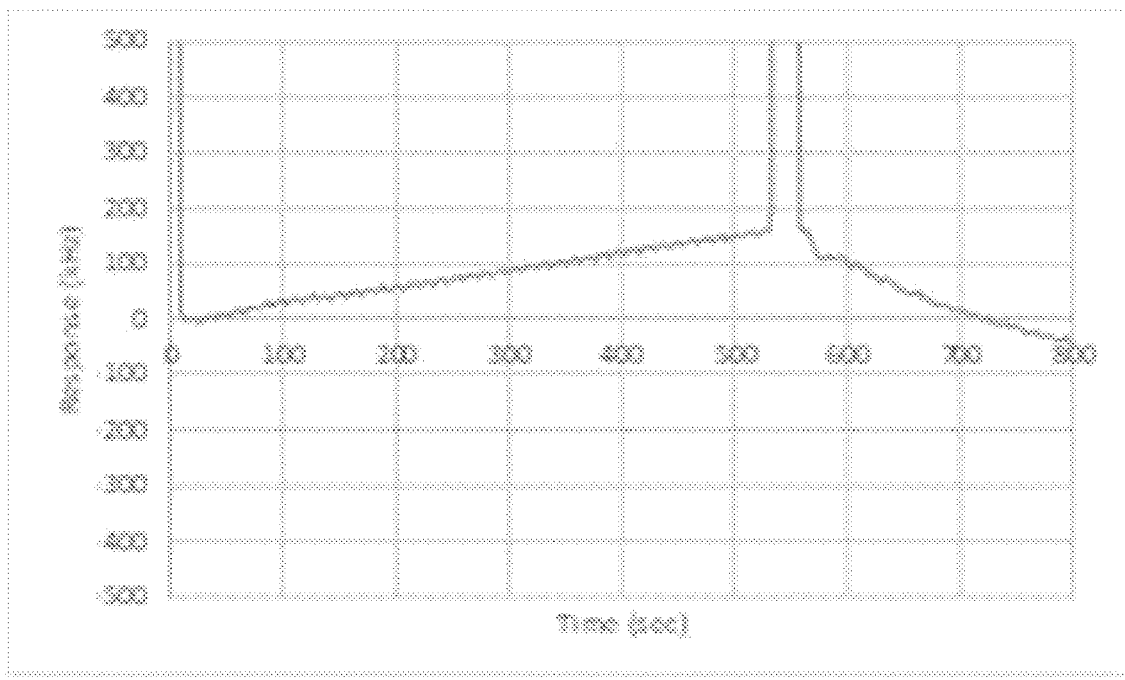

For example and with reference to FIG. 12, cartridge 510 is shown coupled with components of a reader (such as reader 520 depicted in FIG. 10) or another suitable device. When the cartridge 510 is operably coupled to external equipment of a system, sensor apparatus 519 may be electrically coupled to controller 30 via electrical interconnect 529. The sensor apparatus 519, external device, and controller 30 include one or more electronic components to drive the acoustic wave devices 230 into oscillating motion and measure a change in a wave propagation characteristic of the devices 230 as the sample material is passed over the sensing surface of the devices 230.

The system of FIG. 12 includes a pump 600 (e.g., a displacement pump). The pump 600 is operably coupled to valve 610, which is operably coupled to connection ports 534A, 534B. The valve 610 and the pump 600 are operably coupled to the controller 30, which coordinates the pump 600 and the valve 610 to cause the first portion of the sample composition in the first sub-chamber 200A of the sample chamber 200 to flow through the first fluid path across the surface of the acoustic wave devices 230 and then to cause the second portion of the sample composition in the second sub-chamber 200B of the sample chamber 200 to flow through the first fluid path across the surface of the acoustic wave devices 230. As an alternative to the valve 610, the system may include a second pump such that pump 600 is connected to one of the connection ports 534A, 534B and the second pump is connected to the other of the connection ports 534A, 534B.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, the term "and/or" includes any and all combinations of one or more of the associated listed items.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

As used herein, "providing" in the context of providing an article or a device means to make, purchase, or otherwise obtain the article or device.

EXAMPLE

Initial proof of concept studies were performed using a-thyroid stimulating hormoneTSH assay. Briefly, aanti-TSH antibodies were immobilized on resonators by dispensing 350 μm spots using a piezo dispenser onto epoxy silane coated sensors with a resonate frequency of 2.2 GHz. Control resonators were coated with an isotype control. Test was performed on prototype test cartridges comprising a vacuum interface, fluid interface, microfluidic channels, and a bulk acoustic wave resonator. A pump on the instrument moves fluid via the vacuum interface on the cartridge and the fluidic interface on the cartridge. Reagents are placed in wells which are interfaced with the fluidic interface on the cartridge to move different reagents back and forth across the sensor. Sensors and cartridge microfluidic channels were first blocked with a buffer containing bovine serum albumin (BSA). Sensors were then exposed to either the BSA containing buffer or TSH depleted serum. Sensors were then exposed to 100 ng/mL of TSH in either serum or buffer Sensors were electrically connected to a network analyzer which was used to monitor the frequency shift of the devices. A 30 MHz window around the resonate frequency was collect at a sampling rate of approximately 2 samples per second. This data was post processed to determine the frequency shift as a function of time and plotted in excel.

Results of this initial study are presented in FIGS. 13A-D, which show output (response) of the sensor having a surface to which the antibody is bound when serum containing 100 ng/ml of antigen was flowed across the surface 550 seconds after exposure to depleted serum (A); when serum containing 100 ng/ml of antigen was flowed across the surface 550 seconds after exposure to standard wash buffer (B); when serum without antigen (negative sample) was flowed across the surface 550 seconds after exposure to depleted serum (C); and when negative sample was flowed across the surface 550 seconds after exposure to a standard wash buffer. Large blips at ~530 seconds represent air gaps between samples.

Equilibration of the sensor to depleted sample give a flat response to negative sample (C) whereas use of a standard wash buffer gives a large response to negative sample due to viscosity changes and non-specific binding (D). The larger response in (B) relative to (A) is due to addition of non-specific binding and viscosity changes to the frequency change due to mass loading, whereas the response in (A) is due to mass loading alone due to the pre-equilibration, providing more meaningful results.

Those skilled in the art will recognize improvements and modifications to the preferred embodiments of the present disclosure. All such improvements and modifications are considered within the scope of the concepts disclosed herein and the claims that follow.

What is claimed is:

1. A device for determining the presence of an analyte in a sample composition, the device comprising:
    a sample compartment for containing the sample composition to be tested for the presence of an analyte;
    an acoustic wave sensor having a surface to which an analyte capture ligand is bound;
    a first fluid flow path from the sample compartment to the acoustic wave sensor;
    a second fluid flow path from the sample compartment to the acoustic wave sensor;
    a material configured to remove the analyte from the sample composition, wherein the material is positioned to contact the sample composition when the sample composition is in the first fluid flow path but does not contact the sample composition when the sample composition is in the second fluid flow path, wherein the material is upstream of the acoustic wave sensor.

2. The device of claim 1, wherein the sample compartment comprises a first sub-chamber and a second sub-chamber and wherein the first fluid flow path comprises the first sub-chamber and the second fluid flow path comprises the second sub-chamber.

3. The device of claim 2, wherein the sample compartment is configured to cause a first portion of the sample composition to enter the first sub-chamber and a second portion of the sample composition to enter the second sub-chamber when the sample composition is introduced into the sample compartment.

4. The device of claim 2, wherein the material configured to remove the analyte from the sample composition is contained in the first sub-chamber.

5. The device of claim 1, wherein the first fluid flow path comprises a channel, and wherein the material configured to remove the analyte from the sample composition is disposed in or on the channel.

6. The device of claim 1, wherein the first and second fluid flow paths converge upstream of the acoustic wave sensor.

* * * * *